United States Patent [19]
Morita

[11] Patent Number: 6,108,070
[45] Date of Patent: *Aug. 22, 2000

[54] IMAGE RECORDING APPARATUS

[75] Inventor: Naoyuki Morita, Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/048,263

[22] Filed: Mar. 26, 1998

[30] Foreign Application Priority Data

| Mar. 26, 1997 | [JP] | Japan | ................................. 9-073165 |
| Mar. 26, 1997 | [JP] | Japan | ................................. 9-073167 |

[51] Int. Cl.$^7$ .......................... G03B 29/00; G03B 27/32; G03B 27/52
[52] U.S. Cl. ................. 355/29; 355/27; 355/40
[58] Field of Search ................... 355/27, 28, 29, 355/40, 41–43, 50–51; 347/100–101; 358/296

[56] References Cited

U.S. PATENT DOCUMENTS

| 4,851,923 | 7/1989 | Abe et al. | ............................. 358/296 |
| 4,969,016 | 11/1990 | Kudoh | ................................... 355/310 |
| 5,504,555 | 4/1996 | Yamamoto | ............................. 355/29 |
| 5,594,525 | 1/1997 | Benker et al. | ........................ 355/29 |
| 5,713,504 | 2/1998 | Arai et al. | ............................. 226/183 |
| 5,729,326 | 3/1998 | Yamada | .................................... 355/40 |
| 5,731,888 | 3/1998 | Arai | .......................................... 359/204 |
| 5,734,460 | 3/1998 | Nakaoka et al. | ......................... 355/29 |
| 5,734,461 | 3/1998 | Ishikawa et al. | ........................ 355/40 |

*Primary Examiner*—Safet Metjahic
*Assistant Examiner*—Hung Henry Nguyen
*Attorney, Agent, or Firm*—Birch, Stewart, Kolasch & Birch, LLP

[57] ABSTRACT

The improved image recording apparatus includes a cutter for cutting a web of light-sensitive material into sheets of a specified length; a recorder which transports the cut sheets of light-sensitive material for scanning and exposes them in a specified recording position by recording light modulated in accordance with digital image data; a back printer for recording a back print on a reverse surface of the light-sensitive material; a cutting buffer as a transport zone of the light-sensitive material which is provided downstream of the cutter in the direction of transport of the light-sensitive material for scanning; a pre-exposure butter as a transport zone of the light-sensitive material which is provided upstream of the recording position in the direction of transport of the light-sensitive material for scanning; and a post-exposure buffer as a transport zone of the light-sensitive material which is provided downstream of the recording position in the direction of transport of the light-sensitive material for scanning. The image recording apparatus is of a type that cuts a light-sensitive material into sheets which are then subjected to digital raster scan exposure. The apparatus is characterized by minimization of the pathlength of the light-sensitive material which is defined as the distance from the cutter to the developing machine and this contributes to cost and size reduction but a marked improvement in efficiency.

15 Claims, 7 Drawing Sheets

IMAGE RECORDING APPARATUS

BACKGROUND OF INVENTION

This invention relates to the technical field of a digital image recording apparatus.

Heretofore, the image recorded on photographic films such as negatives and reversals (which are hereunder referred to simply as "films") has been commonly printed on light-sensitive materials such as photographic paper by means of direct (analog) exposure, in which projected light from the film is allowed to be incident on the light-sensitive material to achieve its areal exposure.

A new technology has recently been introduced and this is a printer that relies upon digital exposure. Briefly, the image recorded on a film is read photoelectrically, converted to a digital signal and subjected to various image processing operations to produce image data for recording purposes; recording light that has been modulated in accordance with the image data is used to scan and expose a light-sensitive material to record a latent image, which is subsequently developed and output as a print (photograph). The printer operating on this principle has been commercialized as a digital photoprinter.

In the digital photoprinter, the image on a film is read photoelectrically and gradation correction and other operations are performed by subsequent image (signal) processing to determine exposing conditions. Hence, the digital photoprinter has many capabilities in image processing such as editing of printed images by, for example, assembling a plurality of images or splitting a single image into plural images, as well as color/density adjustment and edge enhancement; as a result, prints can be output after various image processing operations have been performed in accordance with specific uses. In addition, the data on a printed image can be supplied into a computer or the like and stored in recording media such as a floppy disk.

A further advantage of the digital photoprinter is that compared to the prints produced by the conventional method of direct exposure, those which are output by the digital photoprinter have better image quality in such aspects as resolution and color/density reproduction.

Having these features, the digital photoprinter is basically composed of an input machine having a scanner (image reader) and an image processor and an output machine having both an exposing device and a developing device.

In the scanner, reading light issuing from a light source is allowed to be incident on a film, from which projected light carrying the image recorded on the film is produced and focused by an imaging lens to form a sharp image on an image sensor such as a CCD sensor, the image being then captured by photoelectric conversion and sent to the image processor as data for the image on the film (i.e., the image data signal). In the image processor, the image data sent from the scanner are subjected to specified image processing operations and the resulting output image data for image recording (i.e., exposing conditions) are sent to the exposing device.

In the exposing device, if it is of a type that relies upon exposure by scanning with an optical beam, the latter is modulated in accordance with the image data sent from the image processor and deflected in a main scanning direction as the light-sensitive material (e.g. photographic paper) is transported in an auxiliary direction perpendicular to the main scanning direction, whereby a latent image is formed as the result of scan exposure (printing) of the light-sensitive material with the optical beam and a back print is also recorded. In the developing device (processor), the exposed light-sensitive material is subjected to development and other specified processing operations so as to output a print which reproduces the image that has been recorded on the film.

In the exposing device, whether it is in the digital photoprinter or an ordinary photoprinter that relies upon "direct" exposure, a virgin light-sensitive material is in the form of a magazine, i.e., a roll contained in a lightproof case. The light-sensitive material is withdrawn out of the magazine in the exposing device and further transported for exposure and other necessary steps.

In the ordinary photoprinter, the light-sensitive material being transported is not cut but remains a web as it is subjected to exposure, back print recording, development, rinse, drying and other necessary steps and only after these steps are complete, the light-sensitive material is cut to individual prints of a specified length. This process requires that frame information (frame perforations) for delineating individual frames (or prints) be formed before or after the exposure of the light-sensitive material. However, the portion of the light-sensitive material where the frame information is formed is simply a waste of space. In addition, frame information have to be formed by special means having a punch, a sensor or the like.

In the exposing device of a digital exposure type, the light-sensitive material in the process of exposure must be transported for scanning in high precision and without stops in order to record images of high quality that are free from unevenness and other defects. On the other hand, the transport of the light-sensitive material has to be stopped at the time of forming frame information and, in addition, the recording of back prints will fluctuate the load in the transport of the light-sensitive material for scanning.

In order to avoid these difficulties, the exposing device in the digital photoprinter is adapted to make a slack (loop) out of the light-sensitive material which is located not only between the exposing position and the frame information forming zone but also between the exposing position and the back print recording zone. If this approach is taken, the volume of the light-sensitive material in loop (the number of frames) must be controlled, the timing of exposure must be properly adjusted and there are many other factors including the complexity of the transport zone and in the control of the light-sensitive material; as a result, the equipment cost and the running cost increase inevitably.

Under the circumstances, an exposing device is desired that can be incorporated in a digital photoprinter and which is capable of exposing a light-sensitive material after it is cut to sheets corresponding to individual prints to be finally produced.

However, the digital exposing device which is capable of exposing a light-sensitive material after it is cut to sheets has not been actually realized yet.

In order to realize an inexpensive, compact and yet efficient exposing device, the pathlength, or the length over which the light-sensitive material emerging from its magazine is transported to the developing machine, is desirably shorter. However, no efficient digital exposing device having a short pathlength has been realized that is suitable for exposure to be performed after a light-sensitive material is cut to individual sheets.

SUMMARY OF INVENTION

A first object, therefore, of the present invention is to provide an improved image recording apparatus for use in a digital photoprinter or other systems that perform digital exposure, back print recording and other operations on a light-sensitive material after it is cut to individual sheets, which apparatus is characterized by the preferably located individual components such as cutter and recording means, compact size and high efficiency.

A second object of the present invention is to provide an improved image recording apparatus (exposing device) for use in a digital photoprinter or other systems that perform digital exposure, back print recording and other operations on a light-sensitive material after it is cut to individual sheets, which apparatus is characterized by the short path-length of the light-sensitive material, low cost, small size and high efficiency.

In order to achieve the first object, the first aspect of the invention provides an image recording apparatus comprising:

a cutter for cutting a web of light-sensitive material to sheets of a specified length;

recording means which transports the cut sheets of light-sensitive material for scanning and exposes them in a specified recording position by means of recording light modulated in accordance with digital image data;

back printing means for recording a back print on a reverse surface of said light-sensitive material;

a cutting buffer as a transport zone of the light-sensitive material which is provided downstream of said cutter in the direction of transport of said light-sensitive material for scanning;

a pre-exposure buffer as a transport zone of the light-sensitive material which is provided upstream of said recording position in the direction of transport of said light-sensitive material for scanning; and a post-exposure buffer as a transport zone of the light-sensitive material which is provided downstream of said recording position in the direction of transport of said light-sensitive material for scanning.

In a preferred embodiment, the image recording apparatus further comprises a distributor with which the exposed and back printed sheets of the light-sensitive material are distributed in a plurality of rows in a direction perpendicular to the transport of said light-sensitive material, a pre-distribution buffer as a transport zone of the light-sensitive material which is provided upstream of said distributor in the direction of transport of said light-sensitive material, and a post-distribution buffer as a transport zone of the light-sensitive material which is provided downstream of said distributor in the direction of transport of said light-sensitive material.

In another preferred embodiment, the image recording apparatus further includes a distributor comprising a light-sensitive material transport means by which the light-sensitive material emerging from said recording position is picked up in said post-exposure buffer at the speed at which it is transported for scanning, and distributing means which, within a zone of transport by said transport means, distributes the as-exposed sheets of the light-sensitive material into a plurality of rows in a direction perpendicular to the direction of transport by said transport means.

In order to achieve the second object, the second aspect of the invention provides an image recording apparatus comprising:

a cutter for cutting a web of light-sensitive material to sheets of a specified length;

recording means which transports the cut sheets of light-sensitive material for scanning and exposes them in a specified recording position by means of recording light modulated in accordance with digital image data;

back printing means for recording a back print on a reverse surface of said light-sensitive material without having contact with it; and a buffer that is provided as a light-sensitive material transport zone between said cutter and said recording position and which optionally forms a slack in the light-sensitive material which has been cut to the sheets of a specified length.

In a preferred embodiment, the image recording apparatus further includes a distributor comprising a light-sensitive material transport means by which the light-sensitive material emerging from said recording position is picked up at the speed at which it is transported for scanning, and distributing means which, within a zone of transport by said transport means, distributes the as-exposed sheets of the light-sensitive material into a plurality of rows in a direction perpendicular to the direction of transport by said transport means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE INVENTION

The image recording apparatus of the invention is described below in detail with reference to the preferred embodiments shown in the accompanying drawings.

The image recording apparatus according to the first aspect of the invention is first described below in detail with reference to FIGS. 1 to 4.

Figure 1A:
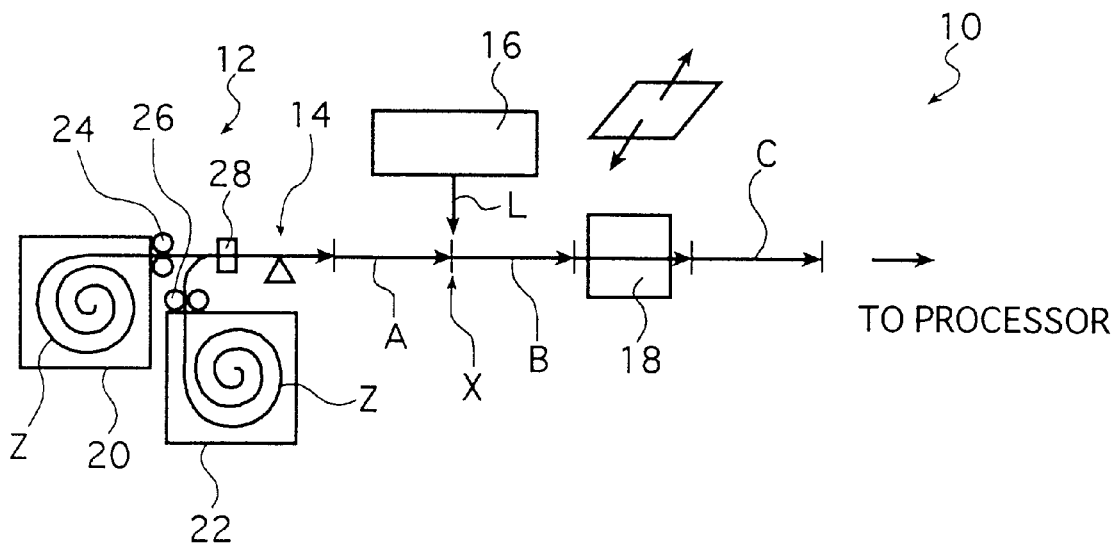
FIGS. 1A and 1B are conceptual diagrams showing the basic layouts of two embodiments of the image recording apparatus according to the first aspect of the invention.
Figure 1B:
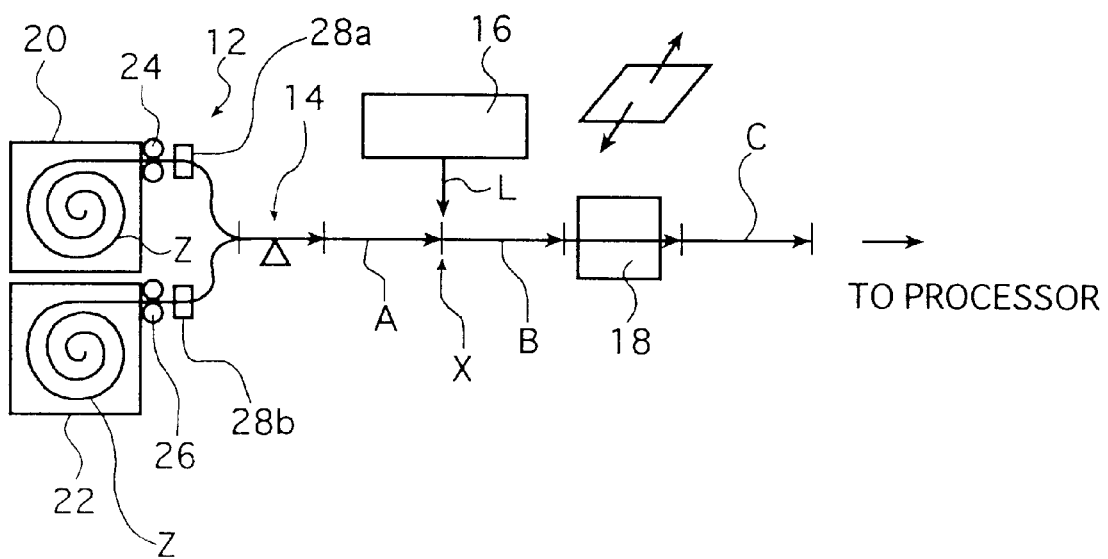

FIGS. 1A and 1B show two basic layouts of the image recording apparatus according to the first aspect of the invention. The image recording apparatus indicated by 10 in FIG. 1A and which is hereinafter simply referred to as the "recording apparatus" is such that a web of light-sensitive material is cut to individual sheets of a specified length associated with the prints to be finally produced and, after back printing (recording of a back print) and digital exposure, the exposed light-sensitive material Z is supplied into a developing machine (also called "processor"). Having these capabilities, the recording apparatus 10 comprises a light-sensitive material supply section 12, a back printing section 14, recording means having an exposing optical unit (hereinafter called "exposing unit") 16 which exposes the light-sensitive material Z in a recording (exposing) position X and scanning transport means (not shown in FIG. 1A), and a distributor 18.

A first buffer A is provided between the back printing section 14 and the recording position X, a second buffer B between the recording position X and the distributor 18, and a third buffer C downstream of the distributor 18 in the direction of transport of the light-sensitive material Z (the term "downstream" as used hereinafter has the meaning just defined above). The buffers A–C are each provided as a part of the transport zone of the light-sensitive material Z.

The embodiment shown in FIG. 1A is a preferred one which, with a view to enhancing the operating performance of the processor, includes the distributor 18 which distributes sheets of the light-sensitive material Z into a plurality of rows in a direction perpendicular to the direction of its transport. However, this is not the sole case of the invention and the distributor 18 may be omitted so that the sheets of light-sensitive material Z emerge from the image recording apparatus in a single row; this alternative embodiment sacrifices the performance of the printer/processor but has the benefit of lower cost.

In this alternative case, not only the distributor 18 but also the third buffer C which serves as a post-distribution buffer as will be described hereinafter can be omitted.

The embodiment shown in FIG. 1A is adapted to record a back print on the light-sensitive material Z before it is exposed. Again, this is not the sole case of the invention and back printing may be done after exposure of the light-sensitive material Z.

To realize a basic design for this case, the composition shown in FIG. 1A may be modified as follows: the back printing section 14 is positioned downstream of the second buffer B rather than upstream of the first buffer A; a pre-distribution buffer is provided downstream of the second buffer B, and the distributor 18 is positioned downstream of the pre-distribution buffer.

Alternatively, the back printing section 14 may be located downstream of the distributor 18 but then a back printing means (printer) has to be provided in association with each of the rows of the light-sensitive material Z being transported. Therefore, considering the equipment cost, the space within the apparatus and other factors, the back printing section 14 is preferably provided upstream of the distributor 18.

Further referring to the recording apparatus 10 shown in FIG. 1A, the light-sensitive material supply section 12 is composed of a loader of two magazines 20 and 22 each containing a roll of light-sensitive material Z within a lightproof case, with the emulsion-coated (light-sensitive) side facing outward, withdrawing roller pairs 24 and 26, and a cutter 28. The illustrated recording apparatus 10 is capable of loading with two magazines 20 and 22 which are usually adapted to contain different types of light-sensitive material Z which is characterized by their size (width), surface gloss (silk-finish, matte and so forth), specifications (e.g. thickness and base type), and so forth. The number of magazines that can be loaded in the recording apparatus of the invention is by no means limited to two and it may be adapted to be capable of loading with only one magazine or three and more magazines.

In the light-sensitive material supply section 12, the withdrawing roller pair 24 or 26 is operated to withdraw the light-sensitive material Z from the corresponding magazine 20 or 22 and the withdrawn light-sensitive material is transported to the back printing section 14 positioned downstream. The transport stops at the point of time when the light-sensitive material Z has been transported downstream from the cutter 28 by a length corresponding to each of the prints to be produced. Subsequently, the cutter 28 turns on to cut the light-sensitive material Z to individual sheets of a specified length.

The recording apparatus 10 shown in FIG. 1A is adapted to be such that the light-sensitive material Z withdrawn from the magazine 20 or 22 is cut with the common single cutter 28; this is not the sole case of the invention and it may be modified as shown in FIG. 1B, where two separate cutters 28a and 28b are provided for the respective magazines 20 and 22.

The back printing section 14 is a site where a back print consisting of various pieces of information, such as the date when the picture was taken, the date of printing (exposure), frame number, film identification (ID) number (code), ID number of the camera used to take the picture and ID number of the photoprinter, is to be recorded on a reverse surface of the light-sensitive material Z (where no emulsion is coated).

In the recording apparatus 10 of the invention, there are no particular limitations on the recording method to be adopted for performing back printing in the back printing section 14 and various back print recording methods used with known photoprinters may be employed, as exemplified by an ink-jet printer, a dot impact printer and a thermal transfer printer. For the reason to be described late, a non-impact recording method such as the one used with an ink-jet printer may be employed with advantage and a particularly preferred printer is an ink-jet printer that uses a heat-fusible ink that is water-insoluble and which is solid at ordinary temperatures.

To be compatible with the recently developed Advanced Photo System, the back printing section 14 is preferably adapted to be capable of marking at least two lines at a time.

If back printing is to be done before the exposure of the light-sensitive material Z as in the illustrated case, a back print may be recorded prior to or after the cutting of the light-sensitive material Z with the cutter 28 or it may be recorded for a duration of time that spans the start and end of the cutting operation. Which timing to choose depends on various factors such as the distance from the cutter 28 to the area where a back print is recorded with the back printing section 14 and the size of the print to be eventually produced.

If desired, a cutting buffer to be described hereinafter may be provided between the cutter 28 and the back printing section 14 so that back printing is always done after the cutting of the light-sensitive material Z. Alternatively, the back printing section 14 may be provided upstream of the cutter 28 so that the light-sensitive material Z is always cut after the recording of a back print.

In the recording apparatus 10 of the invention, the light-sensitive material Z is exposed as it is transported for scanning and the exposure is done with recording light L which has been modulated in accordance with digital image data. This method of exposure is generally referred to as "digital raster scan exposure".

The exposing unit 16 is an optical unit capable of performing this particular way of digital exposure and it may be implemented by a known optical beam scanner that is composed essentially of light sources which issue optical beams for exposing the light-sensitive material Z with red (R), green (G) and blue (B) lights, a modulating means such as AOM (acoustic optical modulator) which modulates the issued light beams in accordance with digital image data, a light deflector such as a polygonal mirror which deflects the modulated light beams in a main scanning direction which is perpendicular to the direction in which the light-sensitive material Z is transported for scanning, and an fθ (scanning) lens with which the deflected light beams are focused to the specified beam spots at a specified point in the recording position X (on the scanning line) in cooperation with specified beam optics.

In the present invention, the exposing unit 16 is by no means limited to this known type of optical beam scanner and it may be replaced by various kinds of digital raster exposing means using various arrays of light-emitting devices and spatial modulating devices which extend in a direction perpendicular to the direction in which the light-sensitive material Z is transported for scanning. Specific examples of such arrays include a PDP (plasma display) array, an ELD (electroluminescent display) array, an LED (light-emitting diode) array, an LCD (liquid-crystal display) array, a DMD (digital micromirror device) array, and a laser array.

The means of transporting the light-sensitive material Z for scanning in the recording apparatus 10 of the invention also is not limited to any particular type and it may be exemplified by various known transport means that are commonly employed in digital scan exposure. Specific advantageous examples include scanning transport means using two transport roller pairs that are provided on opposite sides of the recording position X (scanning line), and scanning transport means using an exposing drum that transports the light-sensitive material Z as it is held in the recording position X and two nip rollers which are provided on opposite sides of the recording position X in such a way that they are held in contact with the exposing drum.

The distributor 18 distributes individual sheets of the light-sensitive material Z in a lateral direction which is perpendicular to the direction of their transport (hence, their transport through the developing machine).

With common silver salt photographic materials which are currently used in printing photographs, development processing is more time-consuming than exposure, and if exposure is performed continuously, development processing cannot keep pace with the exposure but lags behind it and this introduces the need that the as-exposed light-sensitive material be stored temporarily in a reservoir, a stocker or the like.

The distributor 18 is provided with a view to eliminating this difficulty and by distributing individual sheets of the light-sensitive material Z sidewise to form a plurality of rows that overlap in the direction of transport, the throughput of the developing machine can be improved over the case where individual sheets of the light-sensitive material travel in one row (almost doubled in two rows and tripled in three rows) and the time difference between development processing and exposure is practically cancelled to improve the overall performance of the printer/processor.

Figure 2:
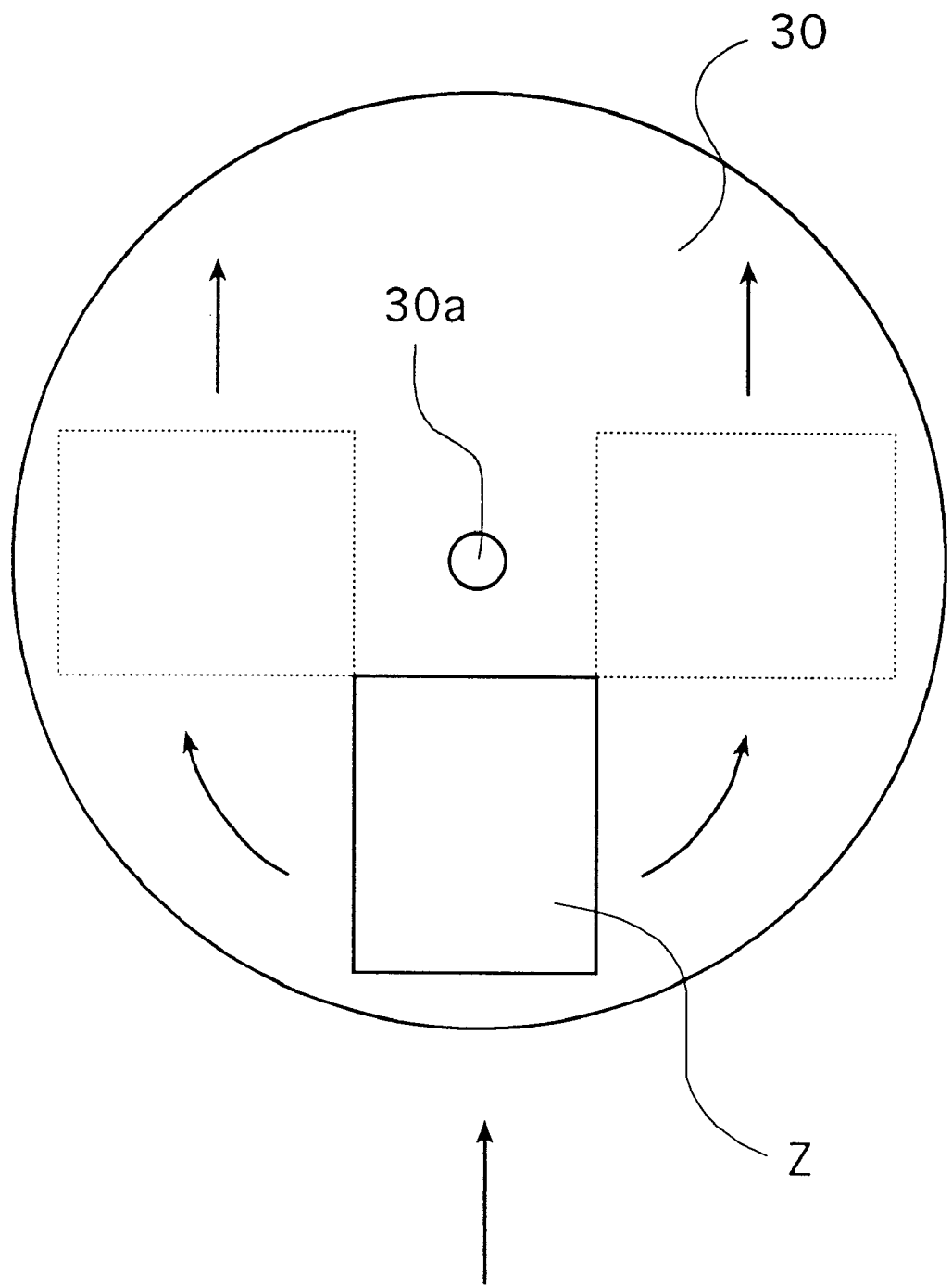
FIG. 2 shows diagrammatically an embodiment of the light-sensitive material distributor which may be employed in the image recording apparatus of the invention.

The method the distributor 18 may employ to distribute individual cut sheets of the light-sensitive material is not limited in any particular way and various methods of cutting sheetings are applicable. One example is shown in FIG. 2 and cut sheets are distributed on a turret 30 which rotates about a shaft 30*a*. According to another method, the means of transporting the light-sensitive material Z is divided into a plurality of blocks, say, three blocks and the center block is moved sidewise to distribute the sheets.

In parallel with the transport of the light-sensitive material Z, cut sheets of the light-sensitive material Z may be distributed efficiently and rapidly over a short distance and an example of the means capable of such distribution is a device comprising the combination of belt conveyors and semicircular (D-shaped) rollers which are produced by cutting a cylinder along the longitudinal axis in such a way as to form a flat portion in a selected area of the transport surface.

Figure 3A:
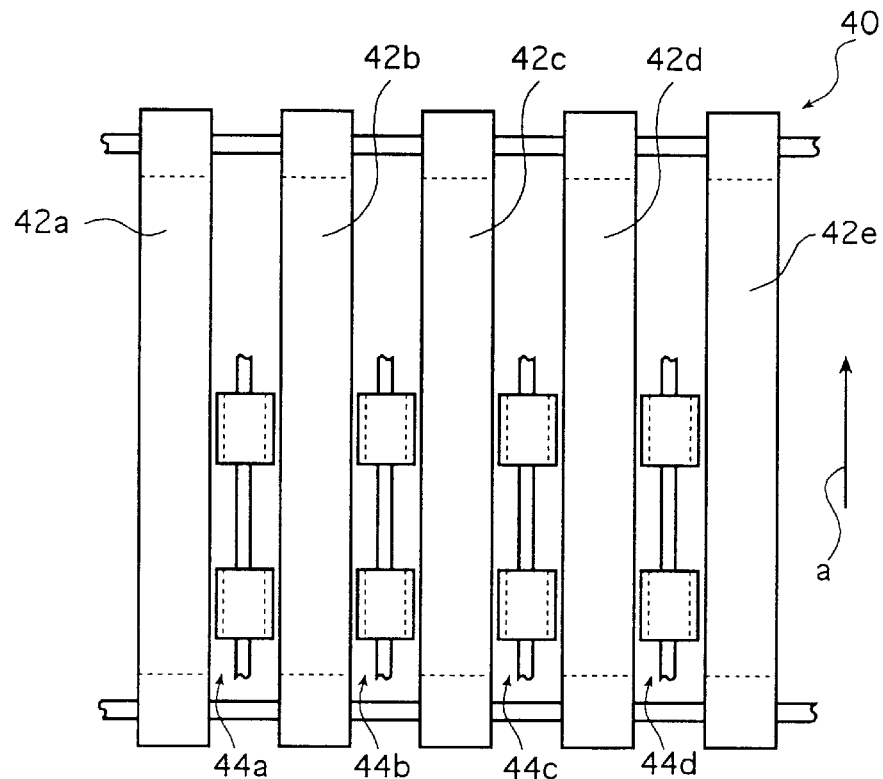
FIG. 3A is a top view showing diagrammatically another embodiment of the light-sensitive material distributor which may be employed in the image recording apparatus of the invention.
Figure 3B:
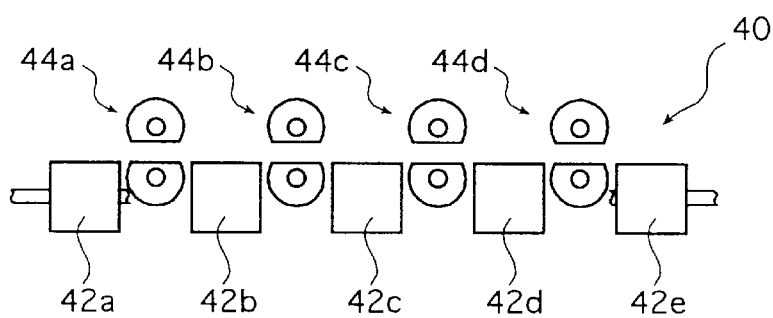
FIG. 3B is a side view of the distributor.
Figure 3C:
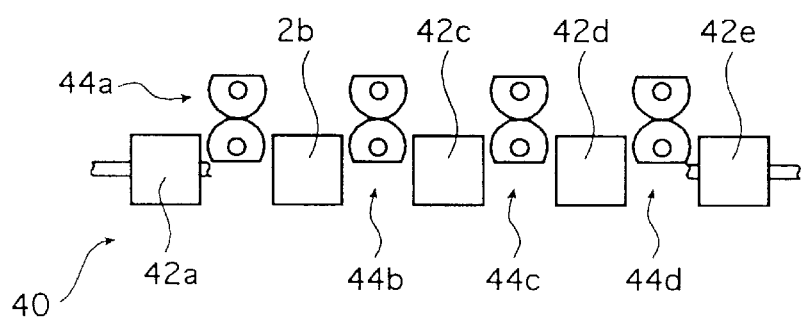
FIG. 3C is a side view of the distributor in a different state.

FIGS. 3A, 3B and 3C show diagrammatically an exemplary short-length distributor 40. As shown, it is composed of five spaced belt conveyors 42 (42*a*, 42*b*, 42*c*, 42*d* and 42*e*) which are means of transporting the light-sensitive material Z downstream (as indicated by arrow a in FIG. 3A) and semicircular roller pairs 44 (44*a*, 44*b*, 44*c* and 44*d*) which are distributing means provided between adjacent belt conveyors 42 to distribute individual sheets of the light-sensitive material Z sidewise to form a plurality of rows.

As shown in FIG. 3B, when the light-sensitive material Z travelling from an upstream position (i.e., the scanning transport means; the second buffer B in the example shown in FIGS. 1A and 1B) is drawn into the short-length distributor 40, each semicircular roller pair 44 is in such a state that their flat portions are opposed to each other. In the case under consideration, the flat portion of the lower positioned semicircular roller is set at the same level or slightly lower than the transport surfaces of the belt conveyors 42, so the transport of the light-sensitive material Z by means of the belt conveyors 42 and so forth will in no way be compromised.

When the individual sheets of light-sensitive material Z have been transported to a specified position on the belt conveyors 42 after the end of exposure, the semicircular roller pairs 44 rotate in a specified direction to distribute those sheets, namely, clockwise if the sheets are to be distributed to the right of FIG. 3A and counterclockwise if they are to be distributed to the left. As is clear from FIG. 3C, if the semicircular roller pairs 44 rotate, the transport surfaces of the lower positioned semicircular rollers will rise above the transport surfaces of the belt conveyors 42, thereby lifting the sheets of light-sensitive material Z from the belt conveyors 42; subsequently, the sheets are held between the upper and lower members of each semicircular roller pair 44 and transported sidewise to be distributed in a plurality of rows.

Another example of the means capable of distributing cut sheets of the light-sensitive material Z efficiently and rapidly over a short distance parallel to its transport is the combination of belt conveyors as transport means on which the individual sheets of light-sensitive material Z are placed to be transported downstream and lift transport means which lifts the sheets of light-sensitive material Z using suckers or the like and transports them sidewise. When the sheets of light-sensitive material Z have been transported to a specified position on the belt conveyors as they emerged from an upstream component, the lift transport means turns on to lift the sheets of light-sensitive material Z and transport them either sidewise or obliquely (downstream) so that they are distributed in a plurality of rows.

Described above are the basic components of the recording apparatus 10 of the invention. In order to ensure that these components including the cutters 28 and the recording means will function properly, the effects of other components have to be eliminated by isolating one component from others. To meet this requirement positively, a buffer must be provided both upstream and downstream of each component so that it functions as a transport zone which is primarily intended to perform only movement of the light-sensitive material Z.

Specifically, the transport of the light-sensitive material Z must be stopped when it is cut with the cutter 28. If a certain load is exerted on the light-sensitive material Z during cutting, the length by which it is cut will vary. To avoid this problem, a cutting buffer must be provided downstream of the cutter 28 for ensuring that the light-sensitive material Z to be cut will stop moving and for isolating any other components that will vary the load on the light-sensitive material Z.

In addition, any variations in the speed at which the light-sensitive material Z is transported for scanning during exposure (or unevenness in scan transport) will result in the development of streaks and other defects in the image to be eventually recorded; therefore, in order to record high-quality images, it is absolutely necessary that no load variations be introduced into the scan transport of the light-sensitive material Z during exposure on account of the stop of scan transport during recording or by other reasons such as the recording of back prints and the cutting of the light-sensitive material into sheets. To satisfy this need, a pre-exposure buffer must be provided upstream of the recording position X for isolating any components that will affect the scan transport of the light-sensitive material Z, and for the same reason, a post-exposure buffer must be provided downstream of the recording position X.

In the illustrated case, the image recording apparatus 10 comprises the distributor 18 and the sheets of light-sensitive material Z are distributed sideways to form a plurality of rows, which are then supplied into the developing machine. However, if other components intervene, the sheets of light-sensitive material Z may sometimes fail to be distributed since they have to be moved sideways for successful distribution. To avoid this possibility, a pre-distribution buffer must be provided upstream of the distributor 18 for isolating the distributor 18 from other components and, for the same reason, a post-distribution buffer must be provided downstream of the distributor 18.

In the image recording apparatus of the invention, the main components such as the cutter(s) 28, the back printing section 14, the exposing means and the distributor 18 are combined appropriately with the buffers described above and these components and buffers are arranged in such a way as to enable exact and efficient operations. In the illustrated recording apparatus 10, the buffers consist of the first buffer A, second buffer B and third buffer C.

The transport means to be employed in these buffers is not limited in any particular way and all of the known methods for transporting sheetings such as transport roller pairs, nip belts, belt conveyors and transport means using suckers may be employed. Needless to say, various kinds of guides, positioning means and so forth may additionally be employed as required. It should be noted that transport means is not essential to the buffers and may be omitted. However, if any transport means is to be provided in the pre-exposure and post-exposure buffers, it must have such a precision and configuration (for example, the formation of loops to be described later) that no load variations will be introduced into the scan transport of the light-sensitive material.

The length of each buffer varies with the length of a print of the largest size that can be handled by the recording apparatus 10 but if the length of the print taken in the direction of its transport is written as Lmax, the buffer length must be greater than Lmax. However, if the buffer length is excessive, the transport path of the light-sensitive material Z becomes so long that the equipment cost is increased whereas the operating efficiency is reduced.

Considering this situation, the basic length of a given buffer is the sum of Lmax and a specified allowance $\alpha$ (=Lmax+$\alpha$). If the print of the largest size is panoramic, the basic length of the buffer is 254 mm+$\alpha$; in case of a photographic paper of 10×12 inch size, the basic length is 3.5 mm+$\alpha$. The allowance U may be determined appropriately in accordance with the distance between transport rollers and other factors; a preferred value is between about 2 mm and about 79 mm.

The transport of the light-sensitive material through the buffers need not be linear but the linear distance of a buffer, namely, the distance between two sites spanning the buffer, can be shortened by forming a loop (slack) of the light-sensitive material within the buffer to ensure that the transport and movement of the light-sensitive material Z in a component upstream of the loop will not introduce load variations into the transport of the light-sensitive material Z in a downstream component and vice versa.

The size of prints to be recorded by the recording apparatus 10 is diverse and ordinary photoprinters can preferably handle from L size (89 mm) to 10×12 inch size (305 mm). Referring to the formation of loops of the light-sensitive material Z, a loop may be formed only in the case of handling large prints; alternatively, a loop may be formed even in the case of handling prints of the smallest size.

The recording apparatus of the invention has basically five buffers as described above (but three buffers will suffice if it does not use the distributor). However, as will be understood from the embodiments shown in FIGS. 1A and 1B, various design modifications such as allowing one buffer to perform two functions or eliminating one or more buffers depending upon various factors including the layout of individual sites, as well as the back printer and the distributor to be employed.

For example, the first buffer A which, as shown in FIGS. 1A and 1B, is provided between the back printing section 14 and the recording position X provides not only a zone for cutting the light-sensitive material Z to a specified length of sheets but also a zone for isolating the recording position X from an upstream component (the back printing section 14 in the embodiment shown in FIGS. 1A and 1B) and, hence, the first buffer A serves as both a cutting buffer and a pre-exposure buffer. In addition, as already mentioned, the transport of the light-sensitive material Z can be stopped as long as back printing continues and to put in another way, the pre-exposure buffer combines with the back printing section 14 to function as a cutting buffer in the illustrated case where back printing is done before exposure.

The second buffer B provided between the recording position X and the distributor 18 provides a zone for isolating the recording position X from a downstream component, namely distributor 18 and it serves as both a post-exposure buffer and a pre-distribution buffer.

If a non-impact printer such as an ink-jet printer is used as recording means in the back printing section 14, a back print can be recorded without introducing any load variations into the transport of the light-sensitive material for scanning. Hence, the use of a non-impact printer enables the back printing section 14 to be provided in either a pre-exposure buffer or a post-exposure buffer.

Specifically, the transport path in the illustrated recording apparatus 10 can be shortened by providing the back printing section 14 in the first buffer A. If the recording apparatus 10 is adapted to perform back printing after exposure, the use of an impacting printer requires that the back printing section be situated downstream of the second buffer B as already mentioned whereas a pre-distribution buffer must additionally be provided downstream of the back printing section. However, if a non-impact printer is used, the layout of the components downstream of the recording position X may be the same as shown in FIGS. 1A and 1B, except that the back printing section 14 is provided in the second buffer B.

Further in addition, if the distributor 18 is implemented as the distributor 40 shown in FIGS. 3A to 3C which uses both belt conveyors and semicircular rollers or as the already mentioned distributor using both belt conveyors and lift transport means, the pre-distribution buffer and the post-distribution buffer can be eliminated or markedly shortened.

In a photoprinter of the type that performs exposure on cut sheets, a plurality of prints are preferably exposed at the shortest possible intervals in succession in order to achieve efficient print production and, hence, the exposed sheets of light-sensitive material Z are fed in succession into the distributor 18.

With a distributor that uses a turret of the type shown in FIG. 2 and one that moves the transport means per se in a lateral direction (perpendicular to the direction of transport of the light-sensitive material Z), the transport speed of the light-sensitive material must be altered in order to secure the time for rotating the turret or moving the transport means; to this end, the distributor has to be isolated not only from the component provided upstream of the distributor but also from the component provided downstream by means of a pre-distribution buffer and a post-distribution buffer.

In contrast, the distributor 40 and the one that uses belt conveyors and lift transport means do not have to alter the speed at which the light-sensitive material is fed into the distributor and yet the individual sheets of the light-sensitive material can be distributed very quickly. The light-sensitive material Z is typically transported for scanning as it is held between rollers and the like, so even if a slight error occurs in the transport by belt conveyors, the load variation it will introduce into the scan transport of the light-sensitive material is negligibly small and, in addition, the speed at which the light-sensitive material is transported through the distributor need not necessarily be equal to the speed at which it is transported for scanning. Hence, the cut sheets of the as-exposed light-sensitive material Z can be accommodated within the distributor at the same speed as the speed at which they are transported for scanning and they can be distributed immediately after they have been accommodated in the distributor; in addition, the distributed sheets can be immediately fed into the developing machine.

Thus, the distributor 40 and the one that uses belt conveyors and lift transport means have the advantage that they can be provided right after the recording position X and that the transport of the distributed sheets of the light-sensitive material is functionally equivalent to a post-distribution buffer; consequently, the need to provide a pre-distribution buffer and a post-distribution buffer is entirely eliminated or, if they are to be used at all, their length can be markedly shortened in accordance with various factors such as the configurations of the recording means, the distributor and the developing machine.

Briefly, the image recording apparatus of the invention is adapted to be capable of forming loops of the light-sensitive material in buffers and uses a non-impact back printing means in combination with a distributor exemplified by the embodiment shown in FIG. 3 or the combined use of belt conveyors and lift transport means; as a result, the transport length of the light-sensitive material is reduced to the smallest possible value, thereby enabling the apparatus to operate with the highest efficiency.

Figure 4:
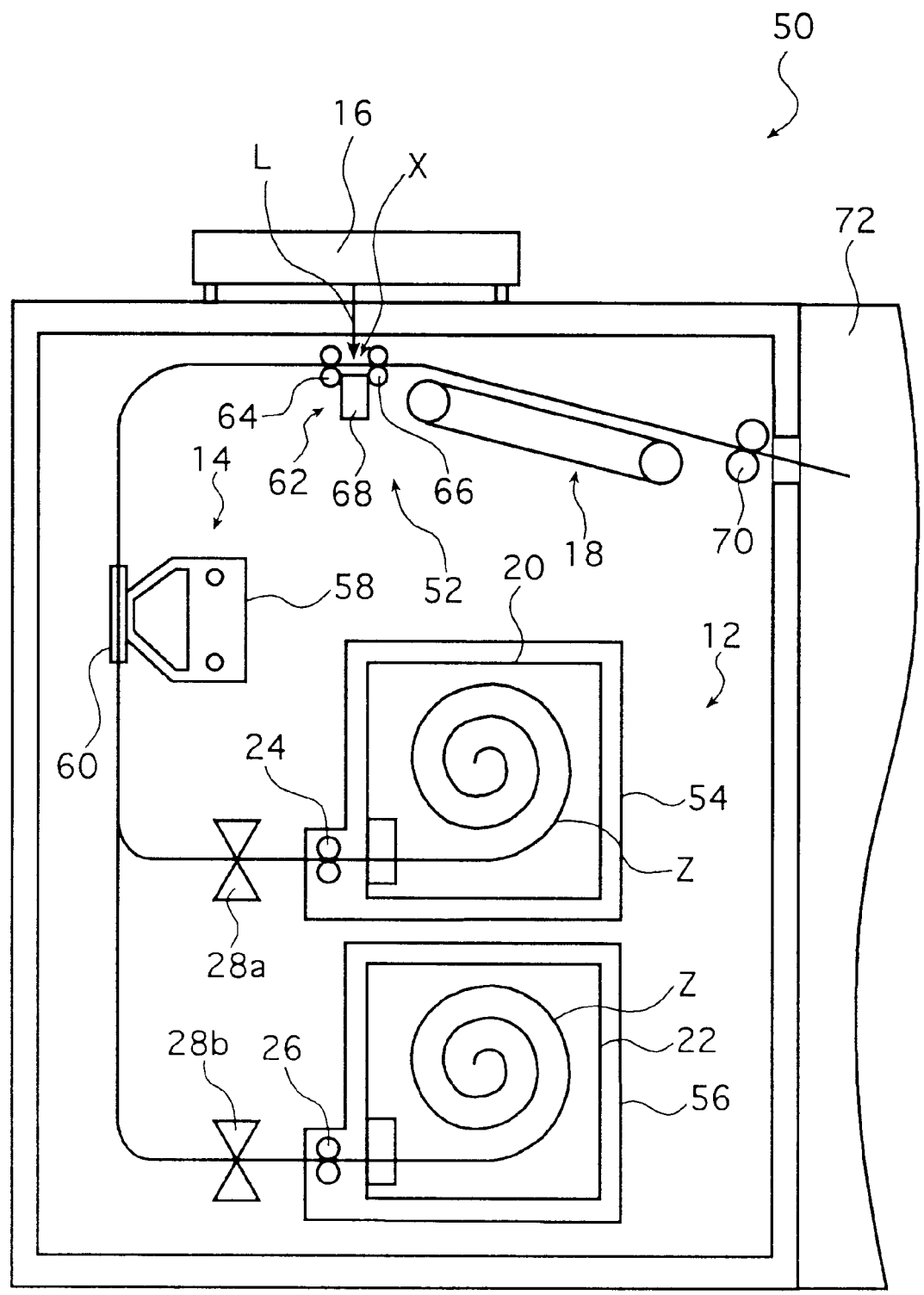
FIG. 4 shows diagrammatically a specific embodiment of the image recording apparatus according to the first aspect of the invention.

FIG. 4 shows diagrammatically a specific embodiment of the image recording apparatus according to the first aspect of the invention. The image recording apparatus generally indicated by 50 in FIG. 4 (which is hereinafter referred to simply as "recording apparatus") is a specific embodiment of the recording apparatus shown in FIG. 1B and, hence, like components are identified by like numerals and the following description is mainly directed to those components which are specific embodiments of the apparatus of FIG. 1B. It should also be noted that means of transporting the light-sensitive material Z such as transport rollers, transport guides, sensors for detecting the light-sensitive material and various other members that are incorporated in known image recording apparatus are also incorporated, as required, in the recording apparatus 50 but they are not shown in FIG. 4 for the sake of clarity in the basic layout of the apparatus.

The recording apparatus 50 shown in FIG. 4 is composed of the light-sensitive material supply section 12, the back printing section 14, a buffer 32, a recording section 52 and the distributor 18.

The light-sensitive material supply section 12 includes loaders 54 and 56 of the magazines 20 and 22, respectively; the withdrawing roller pair 24 is provided in the loader 54 and the withdrawing roller pair 26 is provided in the loader 56; the cutter 28a is provided in association with the loader 54 and the cutter 28b with the loader 56.

As shown in FIG. 4, the recording apparatus 50 has the loader 56 positioned below the loader 54 and the recording position X is located further above; hence, the distance from the cutter 28a, which is associated with the loader 54, to the back printing section 14 located above (the recording position X) is different from the distance from the cutter 28b, which is associated with the loader 56, to the back printing section 14. That is, the cutting buffers which are associated with the cutters 28a and 28b are different in length.

The back printing section 14 is typically a printer 58 using a ink ribbon, which records a back print on the light-sensitive material Z as it is transported with the aid of a guide 60.

The light-sensitive material Z is cut into individual sheets of a specified length and has a back print recorded thereon. The light-sensitive material Z is subsequently transported into the recording section 52 (particularly, transport means 62 for auxiliary scanning).

The recording section 52 comprises an exposing unit 16 and the transport means for auxiliary scanning 62. In the illustrated case, the exposing unit 16 may be the aforementioned optical beam scanner which exposes the light-sensitive material Z using as the recording light L an optical beam that has been modulated in accordance with the recorded image and which is deflected in the main scanning direction (normal to the plane of FIG. 4) which is perpendicular to the direction in which the light-sensitive material Z is transported for scanning by the transport means 62.

The transport means 62 comprises two transport roller pairs 64 and 66 located on opposite sides of the recording position X (scanning line) and a transport guide for exposure 68 to hold more precisely the light-sensitive material Z in the recording position X. With it being held in the recording position X by means of the transport guide 68, the light-sensitive material Z is transported by means of the transport roller pairs 64 and 66 in an auxiliary direction which is perpendicular to the main scanning direction. As already mentioned, the optical beam as the recording light L is deflected in the main scanning direction, so the light-sensitive material Z, as it is transported, is exposed by two-dimensional scanning with the optical beam to form a latent image on the material Z.

In the recording apparatus 50, the zone extending from the exit of the guide 60 in the back printing section 14 to the recording position X in the recording section 52 corresponds to the first buffer A and functions as both a cutting buffer and a pre-exposure buffer.

As already mentioned, the transport of the light-sensitive material Z can be stopped during back printing and, hence, if cutting buffer is to be provided independently, one buffer is realized by the transport path from the cutter 28a to the recording position X and another is realized by the path from the cutter 28b to the recording position X and, obviously, the two cutting buffers have different lengths.

The distributor 18 is provided downstream of the recording section 52. The as-exposed sheets of light-sensitive material Z are distributed sidewise (in a direction perpendicular to their transport) in the distributor 18 to align in a plurality of rows that overlap in the direction of transport. Subsequently, the sheets of light-sensitive material Z are individually fed into a developing machine 72 by means of a transport roller pair 70 and subjected to the necessary treatments in color development, bleach-fix, rinse and other tanks in a manner suitable to the light-sensitive material Z and thereafter dried to yield final prints.

The distributor 18 used in the recording apparatus 50 shown in FIG. 4 is either the short-length distributor 40 using belt conveyors and semicircular rollers or the one that uses belt conveyors and lift transport means.

As a result, the length of the second buffer B provided downstream of the recording position X to serve as both a post-exposure buffer and a pre-distribution buffer (in the illustrated case, the second buffer B extends from the recording position X to the entrance of the distributor 18) and that of the third buffer C which served as a post-distribution buffer (and extends from the exit of the distributor 18 to the downstream transport roller pair 70) can be sufficiently shortened to realize a compact and efficient image recording apparatus.

As described above in detail, according to the first aspect of the invention, cutters for cutting a light-sensitive material into sheets, means of recording a back print, recording means for performing scan exposure of the light-sensitive material and, optionally, means of distributing cut sheets of the light-sensitive material sidewise into a plurality of rows are arranged in an advantageous manner to realize a compact and efficient image recording apparatus.

Figure 5A:
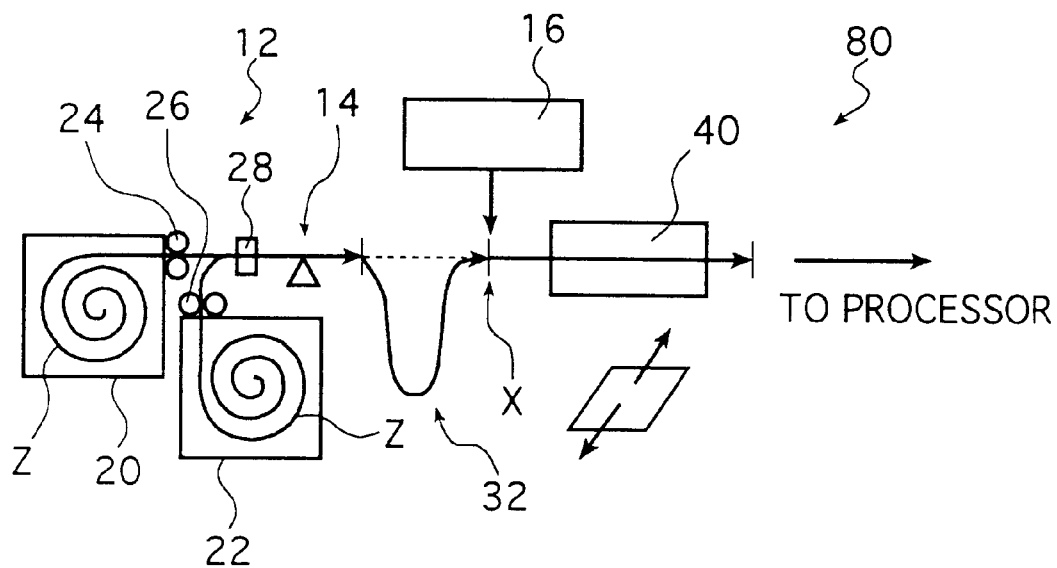
FIGS. 5A and 5B are conceptual diagrams showing the basic layouts of two embodiments of the image recording apparatus according to the second aspect of the invention.
Figure 5B:
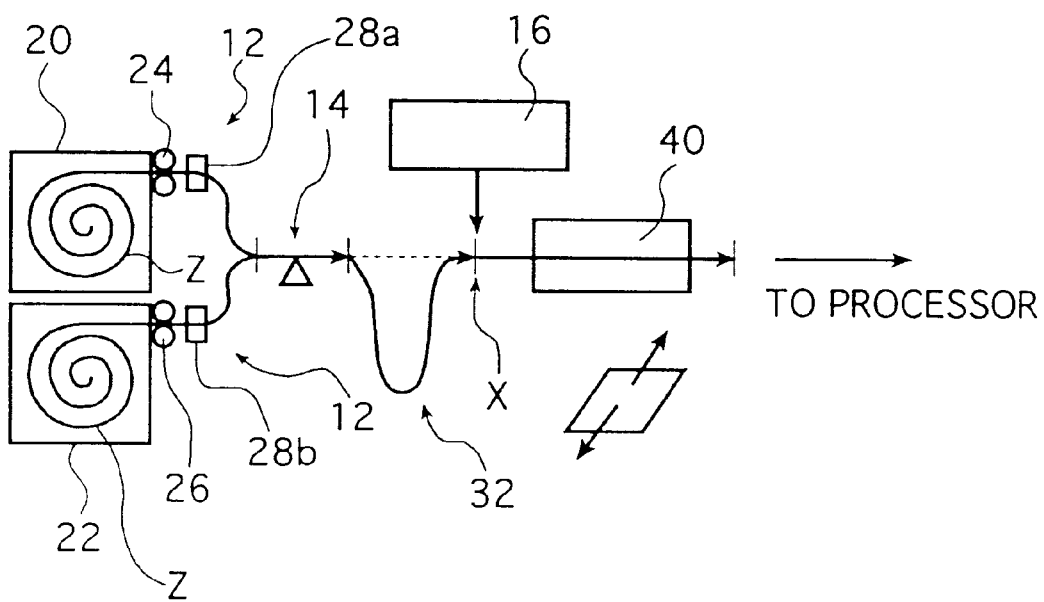

FIGS. 5A and 5B show two basic layouts of the image recording apparatus according to the second aspect of the invention. The image recording apparatus indicated by 80 in FIG. 5A and which is hereinafter simply referred to as the "recording apparatus" is such that a web of light-sensitive material is cut to individual sheets of a specified length associated with the prints to be finally produced and, after back printing (recording of a back print) and digital exposure, the exposed light-sensitive material Z is supplied into a developing machine (also called "processor"). Having these capabilities, the recording apparatus 80 comprises the light-sensitive material supply section 12, the back printing section 14, the recording means having the exposing optical unit (hereinafter called "exposing unit") 16 which exposes the light-sensitive material Z in a recording (exposing) position X and the scanning transport means (not shown in FIGS. 5A and 5B), and the short-length distributor 40. A buffer 32 which optionally makes a loop (slack) out of the light-sensitive material Z is provided as a light-sensitive material transport zone between the back printing section 14 and the recording position X.

The image recording apparatus 80 of the second aspect of the invention as shown in FIGS. 5A and 5B is the same as the image recording apparatus 10 of the first aspect of the invention as shown in FIGS. 1A and 1B, except that the former comprises the buffer 32 for loop formation, uses the short-length distributor 40 instead of the distributor 18, and also applies the non-impact back printer to the back printing section 14; the latter will be described below. Thus, like components are identified by like numerals and the detailed description will be omitted.

The embodiment shown in FIGS. 5A and 5B is a preferred one which, with a view to enhancing the operating performance of the processor, includes the short-length distributor 40 which distributes sheets of the light-sensitive material Z into a plurality of rows in a direction perpendicular to the direction of its transport. However, this is not the sole case of the invention and the short-length distributor 40 may be omitted so that the sheets of light-sensitive material Z emerge from the image recording apparatus in a single row; this alternative embodiment sacrifices the performance of the printer/processor but has the benefit of lower cost.

The embodiment shown in FIGS. 5A and 5B is adapted to record a back print on the light-sensitive material Z before it is exposed. Again, this is not the sole case of the invention and back printing may be done after exposure of the light-sensitive material Z. A basic layout of this alternative case is identical to the layout shown in FIGS. 5A and 5B, except that the back printing section 14 is located between the recording position X and the short-length distributor 40, rather than being downstream from the cutter 28. Alternatively, the back printing section 14 may be located downstream from the short-length distributor 40 but then a back printing means (printer) has to be provided in association with each of the rows of the light-sensitive material Z being transported. Therefore, considering the equipment cost, the space within the apparatus and other factors, the back printing section 14 is preferably provided upstream of the short-length distributor 40.

In the recording apparatus 80 of the invention, the back printing section 14 performs non-impact printing as with an ink-jet printer without making direct contact with the light-sensitive material Z. A particularly preferred printer is an ink-jet printer that uses a heat-fusible ink that is water-insoluble and which is solid at ordinary temperatures.

If back printing is to be done before the exposure of the light-sensitive material Z as in the illustrated case, a back print may be recorded prior to or after the cutting of the light-sensitive material Z with the cutter 28 or it may be recorded for a duration of time that spans the start and end of the cutting operation. Which timing to choose depends on various factors such as the distance from the cutter 28 to the area where a back print is recorded with the back printing section 14 and the size of the print to be eventually produced.

If desired, the back printing section 14 may be provided a little distance ahead of the recording position X (i.e., downstream of the buffer 32) so that back printing is always done after the cutting of the light-sensitive material Z. Alternatively, the back printing section 14 may be provided upstream of the cutter 28 so that it is always cut after the recording of a back print.

In the illustrated case, the buffer 32 is provided as a light-sensitive material transport zone between the back printing section 14 and the recording position X. Depending on the print size (i.e., the length of the light-sensitive material Z) and other factors, the buffer 32 may optionally form a loop (or a slack) out of the light-sensitive material Z.

Various sizes of prints are recordable with the recording apparatus 80 and a typical photoprinter has preferably a capability for handling various print sizes ranging from 89 mm (L size) to 305 mm (10×12 inch size). The buffer 32 may be adapted to be such that it allows prints of the smaller size to travel straightforward (without forming a loop) and that a loop is formed in only prints of the larger size. Alternatively, a loop may also be formed in prints of a minimal size.

The action of the buffer 32 will be described later in greater detail.

If back printing is to be done after exposure as mentioned above, the buffer 32 is provided between the cutter 28 and the recording position X; if the back printing section 14 is located a little distance ahead of the recording position X, the buffer 32 is provided between the cutter 28 and the back printing section 14.

In the embodiment under consideration, the recording apparatus 80 of the invention uses as the distributor the short-length distributor 40 comprising a light-sensitive material transport means by which the light-sensitive material Z emerging from the recording position X is picked up at the speed at which it is transported for scanning, and distributing means which, after the light-sensitive material Z was completely fed into the transport means and within a zone of transport by said transport means, distributes the individual sheets of the light-sensitive material sidewise to form a plurality of rows.

As will be described below in detail, the short-length distributor 40 can be provided immediately downstream of the recording position X (or immediately downstream of the back printing section 14 if a back print is to be recorded after exposure) and the pathlength of the light-sensitive material Z can be sufficiently shortened to enhance the operating efficiency of the recording apparatus 80.

An example of the short-length distributor 40 is the combination of belt conveyors and semicircular (D-shaped) rollers produced by cutting a cylinder along the longitudinal axis in such a way as to form a flat portion in a selected area of the transport surface, as shown in FIGS. 3A, 3B and 3C.

Another preferred example of the short-length distributor 40 is the combination of belt conveyors as transport means which carries the individual sheets of light-sensitive material Z and transports it downstream and lift transport means as a distributing means which lifts the sheets of light-sensitive material Z using suckers or the like and transports them sidewise so that they are distributed in a plurality of rows. When the as-exposed sheets of light-sensitive material Z have been transported to a specified position on the belt conveyors in the short-length distributor 40, the lift transport means turns on to lift the sheets of light-sensitive material Z and transports them either sidewise or obliquely (downstream) so that they are distributed in a plurality of rows.

In the short-length distributor 40 to be used in the invention, it is not absolutely necessary that the transport speed of the belt conveyors be equal to the speed at which the light-sensitive material Z is transported for scanning. The reason will be given later in this specification.

Described above are the basic components of the recording apparatus 80 of the invention. In order to ensure that these components including the cutters 28 and the recording means will function properly, the effects of other components have to be eliminated by isolating one component from others. To meet this requirement positively, a buffer must be provided both upstream and downstream of each component so that it functions as a transport zone which is primarily intended to perform only movement of the light-sensitive material Z.

Specifically, the transport of the light-sensitive material Z must be stopped when it is cut with the cutter 28. If a certain load is exerted on the light-sensitive material Z during cutting, the length by which it is cut will vary; to avoid this problem, a cutting buffer must be provided downstream of the cutter 28 for isolating any other components that will affect the cutting operation.

Any variations in the speed at which the light-sensitive material Z is transported for scanning during exposure (or unevenness in scan transport) will result in the development of streaks in the image to be eventually recorded; therefore, in order to record high-quality images, a pre-exposure buffer must be provided upstream of the recording position X for isolating any components that will affect the scan transport of the light-sensitive material Z, and for the same reason, a post-exposure buffer must be provided downstream of the recording position X.

In the illustrated case, the sheets of light-sensitive material Z are distributed sideways to form a plurality of rows, which are then supplied into the developing machine. However, if other components intervene, the sheets of light-sensitive material Z may sometimes fail to be distributed since they have to be moved sideways for successful distribution. To avoid this possibility, a pre-distribution buffer must be provided upstream of the distributor 40 for isolating other components and, for the same reason, a post-distribution buffer must be provided downstream of the distributor 40.

If the length of a print of the largest size that can be handled by the recording apparatus is taken in the direction of its transport and written as Lmax, the basic length of a given buffer is the sum of Lmax and a specified allowance $\alpha$ (=Lmax+$\alpha$). If the print of the largest size is panoramic, the basic length of the buffer is 254 mm+$\alpha$; in case of a photographic paper of 10×12 inch size, the basic length is 305 mm+$\alpha$.

Thus, the pathlength of the light-sensitive material through an ordinary recording apparatus, namely, the length over which the light-sensitive material emerging from the magazine is transported to the developing machine, is long enough to make the apparatus bulky while reducing efficiency due, for example, to increased cost.

In contrast, the pathlength in the recording apparatus 80 of the invention is reduced to the smallest possible value by employing the buffer 32 which optionally forms a loop of the light-sensitive material Z, the non-impact back printing means and the aforementioned short-length distributor 40 and this reduction in the pathlength contributes to realization of the compact, inexpensive and efficient recording apparatus 80.

Stated more specifically, the buffer 32 provided between the cutter 28 and the recording position X serves as both a cutting buffer and a pre-exposure buffer and is adapted to form, as required, a loop of the light-sensitive material Z within itself, whereby the interaction between the cutter 28 and the scan transport of the light-sensitive material Z is eliminated and the linear distance of the buffer 32 is shortened.

It should be noted that the transport of the light-sensitive material Z can be stopped as long as back printing continues and to put in another way, the buffer 32 combines with the back printing section 14 to function as a cutting buffer in the illustrated case where back printing is done before exposure.

In addition, the use of the non-impact back printing means such as an ink-jet printer contributes to eliminate the variations that may be caused by the recording of a back print in the load in the transport of the light-sensitive material for scanning. As a result, the exposure of the light-sensitive material Z can be accomplished simultaneously with the recording of a back print, and neither a pre-exposure buffer nor a post-exposure buffer need be set for the back printing section 14.

Therefore, in the illustrated case, not only the buffer 32 but also a pre-exposure buffer including the distance of the back printing section 14 can be formed and this contributes to further reduce the linear distance between the cutter 28 and the recording position X, or alternatively, only a smaller loop need be formed in the buffer 32. A further advantage is that even if the back printing section 14 is provided immediately before or after the recording position X, neither a pre-exposure buffer nor a post-exposure buffer need be set in association with the back printing section 14 and, hence, the pathlength in the recording apparatus will not increase significantly; conversely, the pathlength may be shortened and yet the degree of freedom in various design parameters such as the position of the back printing section 14 can be enhanced.

Further in addition, the use of the short-length distributor 40 contributes to either eliminate or markedly shorten the pre-distribution buffer, as well as the post-distribution buffer.

In a photoprinter of the type that performs exposure on cut sheets, a plurality of prints are preferably exposed at short intervals in succession in order to achieve efficient print production and, hence, the exposed sheets of light-sensitive material Z will emerge in succession from the recording means. In two commonly employed distributors, one using a turret as shown in FIG. 2 and the other using split transport means, part of which is moved sidewise, the transport speed of the light-sensitive material Z has to be increased at a certain point of time in order to secure the rotation of the turret or the time required by the movement of the transport means; to meet this requirement, the turret and the transport means have to be isolated from not only upstream but also downstream components by providing a pre-distribution buffer and a post-distribution buffer (a speed regulating buffer in association with the developing machine).

On the other hand, the light-sensitive material Z is typically transported for scanning as it is held between rollers or the like. Therefore, even if some sheets of the light-sensitive material Z in the process of exposure are carried on belt conveyors in the short-length distributor 40 of the invention, the variations that will be exerted on the load in the scan transport of the light-sensitive material are negligibly small.

Hence, the short-length distributor 40 may be provided immediately after the recording position X such that the light-sensitive material Z being exposed can be picked up at the speed at which it is transported for scanning; in addition, the light-sensitive material Z can be accommodated by the transport means in the short-length distributor 40 irrespective of the speed of transport by said transport means and without causing any variations in the load in the scan transport of the light-sensitive material; in addition, the sheets of light-sensitive material Z are rapidly distributed by the distributing means at the point of time when they are accommodated by the transport means in the distributor 40 after the end of exposure, further in addition, the transport of the distributed sheets of light-sensitive material Z by the transport means is functionally equivalent to the use of a post-distribution buffer.

Thus, using the short-length distributor 40 of the invention, one can eliminate the need to provide a pre-distribution buffer and a post-distribution buffer, or if they are to be used at all, their length can be markedly shortened in accordance with various factors such as the compositions of the recording means and the developing machine.

As already mentioned, the most salient aspect of the invention lies in the fact that the buffer 32 which is capable of forming a loop of the light-sensitive material as required is provided between the cutter 28 and the recording position X and used in combination with the non-impact back printing means and the short-length distributor 40. On account of this feature, the number of buffers that have been necessary in the conventional apparatus is substantially reduced to a minimum and the buffers that cannot be dispensed with are reduced in their length (linear distance); as a result, the pathlength of the light-sensitive material Z is reduced to the smallest possible value, thereby accomplishing the construction of an efficient, compact and inexpensive image recording apparatus.

Figure 6:
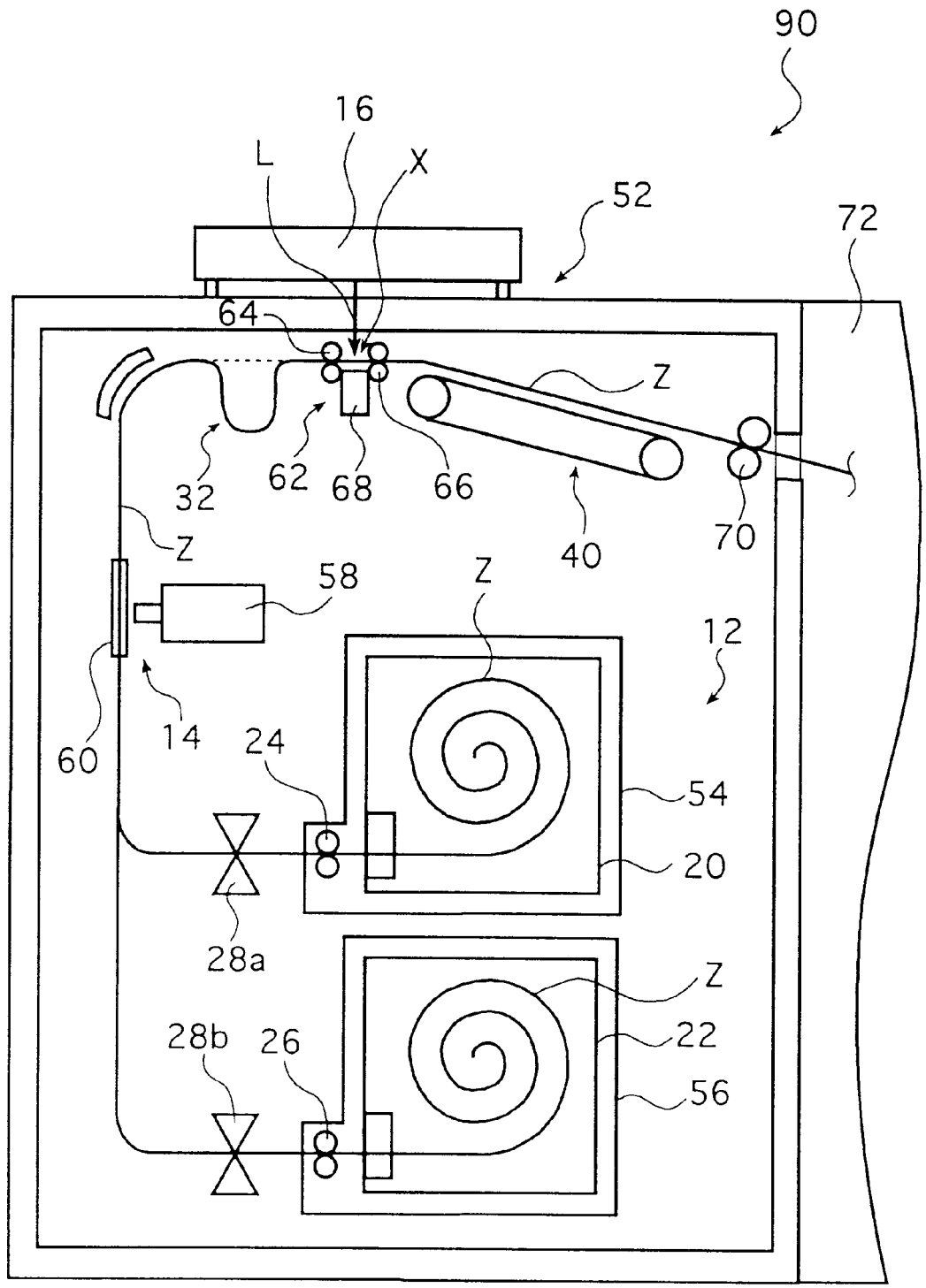
FIG. 6 shows diagrammatically a specific embodiment of the image recording apparatus according to the second aspect of the invention.

FIG. 6 shows diagrammatically a specific embodiment of the image recording apparatus according to the second aspect of the invention. The image recording apparatus generally indicated by 90 in FIG. 6 (which is hereinafter referred to simply as "recording apparatus") is a specific embodiment of the recording apparatus shown in FIG. 5B and, hence, like components are identified by like numerals and the following description is mainly directed to those components which are specific embodiments of the apparatus of FIG. 5B. It should also be noted that the image recording apparatus 90 shown in FIG. 6 is the same as the image recording apparatus 50 shown in FIG. 4 except for the loop buffer 32 and the short-length distributor 40; hence, like components are identified by like numerals and the detailed description will be omitted.

The recording apparatus 90 shown in FIG. 6 is composed of the light-sensitive material supply section 12, the back printing section 14, the buffer 32, the recording section 52 and the short-length distributor 40.

As shown in FIG. 6, in the recording apparatus 90, the back printing section 14 is typically an ink-jet printer 58, which records a back print on the light-sensitive material Z as it is transported with the aid of a guide 60.

The light-sensitive material Z is taken out of the magazines 20 and 22 in the loaders 54 and 56 of the light-sensitive material supply section 12 and cut into individual sheets of a specified length by means of the cutters 28a and 28b and has a back print recorded thereon in the back printing section 14. The sheets are then fed into the buffer 32, where a loop is formed in accordance with their size (i.e., the size of the prints to be eventually produced); the light-sensitive material Z is subsequently transported into the recording section 52 (particularly, transport means 62 for auxiliary scanning).

The optical beam is deflected in the main scanning direction, so the light-sensitive material Z transported by the transport means 62 in the auxiliary scanning direction is exposed by two-dimensional scanning with the optical beam in the exposing unit 16 of the recording section 52 to form a latent image on the material Z.

The short-length distributor 40 is provided downstream of the recording section 52. The as-exposed sheets of light-sensitive material Z are delivered into the short-length distributor 40 at the scan transport speed by the transport means for auxiliary scanning 62. After they have been transported to a specified position in the short-length distributor 40, the exposed sheets of the light-sensitive material Z are distributed sidewise (in a direction perpendicular to their transport) to align in a plurality of rows that overlap in the direction of transport. Subsequently, the sheets of light-sensitive material Z are individually fed into a developing machine 72 by means of a transport roller pair 70 and subjected to the necessary treatments in color development, bleach-fix, rinse and other tanks in a manner suitable to the light-sensitive material Z and thereafter dried to yield final prints.

As shown in FIG. 6, the recording apparatus 90 of the invention uses the non-impact back printing means such as the ink-jet printer 58, has the buffer 32 provided between the cutter 28 and the recording position X for optical formation of a loop, and also uses the aforementioned short-length distributor 40. Because of this arrangement, the pathlength of the light-sensitive material Z in the recording apparatus 90 as it emerges from the cutter 28 and passes through the recording position X and the short-length distributor 40 to reach the transport roller pair 70 is sufficiently short to reduce the size and cost of the apparatus and yet enhances its efficiency.

Figure 7:
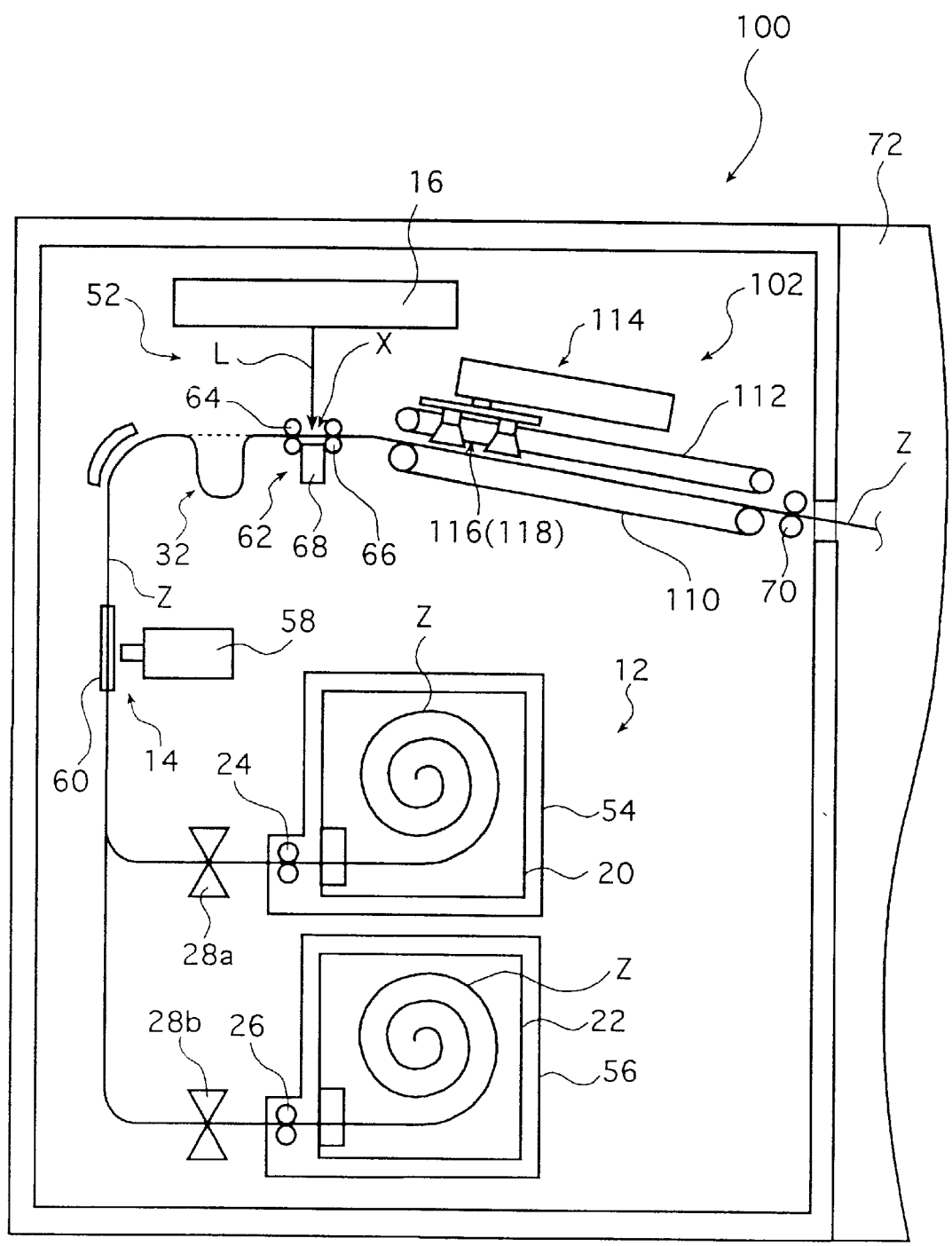
FIG. 7 shows diagrammatically another embodiment of the image recording apparatus of the invention.

FIG. 7 shows diagrammatically another embodiment of the image recording apparatus of the invention. The image recording apparatus 100 shown in FIG. 7 has completely the same structure as that of the image recording apparatus 90 shown in FIG. 6 except that the short-length distributor 40 is replaced by a short-length distributor 102. Then, like components are identified by like numerals and the description thereof will be omitted. It should be noted that the short-length distributor 102 used in the image recording apparatus 100 shown in FIG. 7 can be used as the distributor of the image recording apparatus according to the first aspect of the invention exemplified by the distributor 18 in the image recording apparatus 50 shown in FIG. 4.

The short-length distributor 102 located downstream of the recording section 52 (transport means for auxiliary scanning 62) in the image recording apparatus 100 shown in FIG. 7 is now described below.

This is a distributor which employs belt conveyors of the aforementioned type and lift transport means using suckers (vacuum suction pads). Specifically, the short-length distributor 102 is composed of belt conveyors 110 as transport means on which the light-sensitive material Z is placed and transported downstream, auxiliary belt conveyors 112 of a smaller width that are disposed above the respective belt conveyors 110 along the center of their width, and distributing means 114.

The belt conveyors 110 and the auxiliary belt conveyors 112 are not of such a type that the light-sensitive material Z being transported is held between one belt conveyor 110 and the opposed auxiliary belt conveyor 112; in fact, the auxiliary belt conveyors 112 are slightly spaced from the belt conveyors 110 to which they are opposed. Briefly, the chief function of the auxiliary belt conveyors 112 is to depress any curl of the light-sensitive material Z so as to assist in its transport with the belt conveyors 110 and also to ensure that it is positively sucked in position by the distributing means 114 (in particular, suction units 116 and 118).

The speed at which the light-sensitive material Z is transported by the belt conveyors 110 and the auxiliary belt conveyors 112 is set to be slightly faster than the speed at which it is transported for scanning. This assures positive elimination of the effect the drive of the be lt conveyors 110 and the auxiliary belt conveyors 112 will have on the scanning transport of the light-sensitive material Z.

The distributing means 114 has two suction units 116 and 118 each having two suckers connected to a suction means (not shown). The suction units 116 and 118 are provided on opposite sides of the width of each auxiliary belt conveyor 112. The suction unit 116 provided toward the operator (and away from the plane of the paper in FIG. 7) sucks the light-sensitive material Z in position and lifts it to some height, moves it obliquely downstream to the right (toward the operator and away from the plane of the paper) as seen in the direction of transport of the light-sensitive material Z and, thereafter, the suction is released to set aside a cut sheet of the light-sensitive material to the right. Similarly, the suction unit 118 provided away from the operator lifts the light-sensitive material Z and moves it obliquely downstream to the left so that a cut sheet of the light-sensitive material is set aside to the left.

To attain these results, each auxiliary belt conveyor 112 should have such a width that even a sheet of the light-sensitive material Z that has the smallest lateral size across can be sucked in position by means of the suction units 116 and 118.

The means of moving the suction units 116 and 118 is not limited in any particular way and various known methods may be applicable, as exemplified by a moving means using links, a means using cams, means using guide rails and guide slots, and appropriate combinations of these methods.

Cut sheets of the as-exposed light-sensitive material Z are ejected onto the belt conveyors 110 but, being held by the scanning transport means 62 (specifically by the transport roller pair 66), the transport of the light-sensitive material Z is governed by the scanning transport means 62 and its transport speed is equal to the speed at which it is transported for scanning. When the light-sensitive material Z is released from the scanning transport means 62 and transported to a specified position by the belt conveyors 110, the sheets of the light-sensitive material are sucked and lifted, as required, by the suction unit 116 or 118 and subsequently set aside to either right or left.

For example, if setting aside of a sheet to the right by means of the suction unit 116, setting aside to the left by means of the suction unit 118 and straight passage of a sheet without setting it aside in either direction are repeated in succession, cut sheets of the light-sensitive material Z can be distributed in three rows; on the other hand, if setting aside to the right by means of the suction unit 116 alternates with setting aside to the left by means of the suction unit 118, sheets of the light-sensitive material Z can be distributed in two rows.

The illustrated recording apparatus 100 and other versions of the image recording apparatus of the invention may be adapted not to distribute cut sheets of all types of light-sensitive material Z; if sheets of the light-sensitive material are too large to be processed in a plurality of rows or if batchwise rather than continuous processing is to be performed, sheets of the light-sensitive material Z may not be distributed in a plurality of rows but supplied in a single row into the processor 72.

If sheets of the light-sensitive material Z are to be distributed at all, they may be distributed in the same number of rows regardless of their size or, alternatively, they may be distributed in different numbers of rows depending upon the size of the light-sensitive material Z, for example, in three rows for L size or in two rows for an 8×10 inch size.

As described above in detail, the second aspect of the present invention relates to an image recording apparatus of a type that cuts a light-sensitive material in to sheets which are then subjected to digital raster scan exposure; the apparatus is characterized by minimization of the pathlength of the light-sensitive material which is defined as the distance from the cutter to the developing machine and this contributes to cost and size reduction but a marked improvement in efficiency.

While the image recording apparatus of the invention has been described above in detail, the foregoing is by no means the sole example of the invention and various improvements and alterations can of course be made without departing from the spirit and scope of the invention.

What is claimed is:

1. An image recording apparatus comprising:

a cutter for cutting a web of light-sensitive material into cut sheets of a specified length;

recording means provided downstream of said cutter which transports the cut sheets of light-sensitive material for scanning and exposes them in a specified recording position by means of recording light modulated in accordance with digital image data;

back printing means for recording a back print on a reverse surface of said light-sensitive material;

a cutting buffer as a transport zone of the light-sensitive material which is provided downstream of said cutter in the direction of transport of said light-sensitive material for scanning;

a pre-exposure buffer as a transport zone of the light-sensitive material which is provided upstream of said recording position in the direction of transport of said light-sensitive material for scanning; and a post-exposure buffer as a transport zone of the light-sensitive material which is provided downstream of said recording position in the direction of transport of said light-sensitive material for scanning, wherein each length of said cutting buffer, said pre-exposure buffer and said post-exposure buffer along the direction of transport is a sum of a length of a maximum size of said cut sheets of the light sensitive material taken in the direction of transport and a specified allowance, said maximum size capable of being exposed by said recording means.

2. The image recording apparatus according to claim 1, further comprising:

a distributor with which the exposed and back printed sheets of the light-sensitive material are distributed in a plurality of rows in a direction perpendicular to the transport of said light-sensitive material;

a pre-distribution buffer as a transport zone of the light-sensitive material which is provided upstream of said distributor in the direction of transport of said light-sensitive material; and a post-distribution buffer as a transport zone of the light-sensitive material which is provided downstream of said distributor in the direction of transport of said light-sensitive material.

3. The image recording apparatus according to claim 2, wherein each length of said pre-distribution buffer and said post-distribution buffer along the direction of transport is a sum of a length of a maximum size of said cut sheets of the light sensitive material taken in the direction of transport and a specified allowance, said maximum size capable of being exposed by said recording means.

4. The image recording apparatus according to claim 2, wherein one buffer serves as both said post-exposure buffer and said pre-exposure buffer.

5. The image recording apparatus according to claim 1, further comprising a distributor comprising:

a light-sensitive material transport means by which the light-sensitive material emerging from said recording position is picked up in said post-exposure buffer at a speed at which it is transported for scanning; and distributing means which, within a zone of transport by said transport means, distributes exposed sheets of the light-sensitive material into a plurality of rows in a direction perpendicular to the direction of transport by said transport means.

6. The image recording apparatus according to claim 5, wherein said distributor is provided within said post-exposure buffer and wherein said zone of transport by said transport means functions as said post-exposure buffer.

7. The image recording apparatus according to claim 1, wherein one buffer serves as both said cutting buffer and said pre-exposure buffer.

8. The image recording apparatus according to claim 1, wherein said back printing means is a non-impact printer.

9. An image recording apparatus comprising:

a cutter for cutting a web of light-sensitive material into cut sheets of a specified length;

recording means provided downstream of the cutter which transports the cut sheets of light-sensitive material for scanning and exposes them in a specified recording position by means of recording light modulated in accordance with digital image data;

back printing means for recording a back print on a reverse surface of said light-sensitive material without having contact with it; and a buffer that is provided as a light-sensitive material transport zone between said cutter and said recording position and which optionally forms a slack in the light-sensitive material which has been cut to the sheets of a specified length, wherein said buffer has a size capable of forming a slack in a maximum size of said cut sheets of the light sensitive material capable of being exposed by said recording means.

10. The image recording apparatus according to claim 9, further comprising a distributor comprising a light-sensitive material transport means by which the light-sensitive material emerging from said recording position is picked up at a speed at which it is transported for scanning; and distributing means which, within a zone of transport by said transport means, distributes exposed sheets of the light-sensitive material into a plurality of rows in a direction perpendicular to the direction of transport by said transport means.

11. The image recording apparatus according to claim 10, wherein said distributor is provided downstream of said recording position in a vicinity of the recording position.

12. The image recording apparatus according to claim 11, wherein said zone of transport by said transport means functions as a post-exposure buffer which is a transport zone of said light-sensitive material provided downstream of the recording position.

13. The image recording apparatus according to claim 9, further comprising:

a distributor with which the exposed and back printed sheets of the light-sensitive material are distributed in a plurality of rows in a direction perpendicular to the transport of said light-sensitive materials;

a pre-distribution buffer as a transport zone of the light-sensitive material which is provided upstream of said distributor in the direction of transport of said light-sensitive material; and a post-distribution buffer as a transport zone of the light-sensitive material which is provided downstream of said distributor in the direction of transport of said light-sensitive material.

14. The image recording apparatus according to claim 13, wherein each length of said pre-distribution buffer and said post-distribution buffer along the direction of transport is a sum of a length of a maximum size of said cut sheets of the light sensitive material taken in the direction of transport and a specified allowance, said maximum size capable of being exposed by said recording means.

15. The image recording apparatus according to claim 13, wherein said pre-distribution buffer functions as a post-exposure buffer which is said transport zone of the light-sensitive material provided downstream of the recording position.

* * * * *